Patented Aug. 30, 1927.

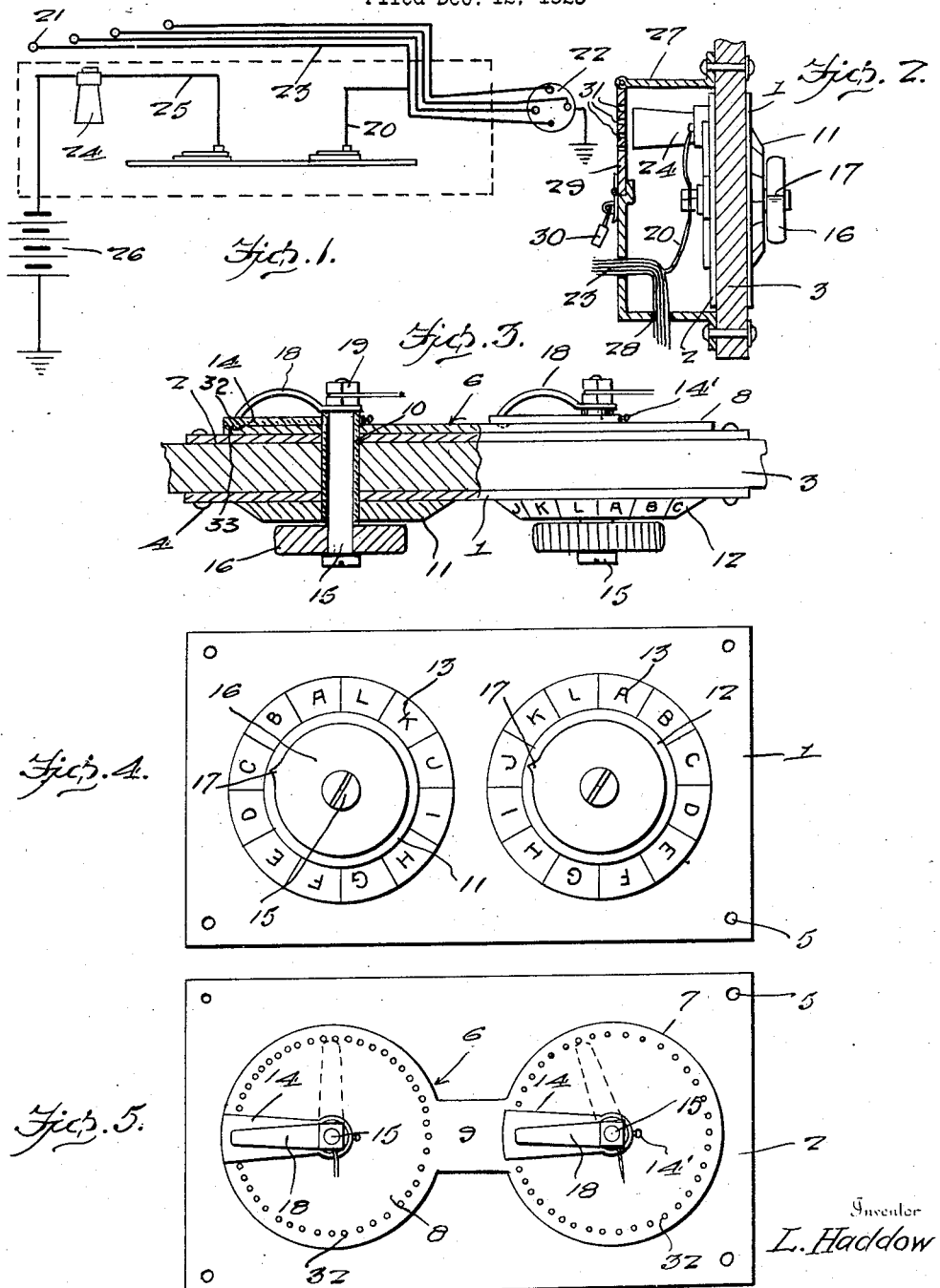
Aug. 30, 1927.
L. HADDOW
1,640,603
ELECTRIC BURGLAR ALARM FOR MOTOR VEHICLES
Filed Dec. 12, 1925

1,640,603

UNITED STATES PATENT OFFICE.

LAURENCE HADDOW, OF COLMOR, NEW MEXICO.

ELECTRIC BURGLAR ALARM FOR MOTOR VEHICLES.

Application filed December 12, 1925. Serial No. 75,065.

This invention relates to improvements in burglar alarm systems and is more particularly adapted for use upon motor vehicles.

One of the important objects of the present invention is to provide electrically operated alarm device on a motor vehicle whereby an audible signal will be automatically actuated when the vehicle is tampered with by any unauthorized person.

A further object is to provide an electric burglar alarm of the above mentioned character which includes a means for normally breaking the circuit to the signal member whereby the vehicle may be actuated without the signal being actuated, said means being further of such a nature to attract attention so that the same will be caused to be operated whereupon the signal will be automatically sounded should any one attempt to operate the aforementioned means without knowing the proper combination provided for preventing the closing of the circuit to the signal.

A still further object is to provide a switch for electric burglar alarm systems on motor vehicles which will at all times be positive and efficient in carrying out the purposes for which it is designed, the same being of such construction as to obviate the necessity of having to employ a means for actuating the same.

A still further object is to provide a switch of the above character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming part of this application and in which like numerals designate like parts throughout the same:

Figure 1 is a wiring diagram illustrating the ignition system and showing the manner in which my improved switch is associated therewith and with the audible signal.

Figure 2 is a vertical sectional view through the housing or casing secured on the front or inner face of the dash board of a motor vehicle and disclosing the manner in which the switch is arranged on the dash board.

Figure 3 is a view partly in elevation and partly in section of a switch, the view being a top plan.

Figure 4 is a front elevation of the switch, and

Figure 5 is a rear elevation.

In the drawing wherein for the purpose of illustration is shown the preferred embodiment of my invention, the numerals 1 and 2 designate the front and rear base plates respectively, the same being of rectangular design and being adapted to be secured on the opposite sides of the dash board 3 of a motor vehicle through the medium of the fastening elements 4 which extend through the openings 5 provided therefor in the respective corners of each of the plates.

Carried by the rear plate 2 is a contact plate designated generally by the muneral 6, the same including the substantially circular end portions 7 and 8 respectively, the same being connected together through the medium of the reduced intermediate portion 9. This construction is more clearly illustrated in Figure 5 of the drawing.

A sleeve 10 of non-conductive material extends centrally through each of the circular portions of the contact plate 6, the forward portions of the sleeve extending through the front and rear base plates as well as through the dash board 3. A pair of dials 11 and 12 respectively are secured on the forward ends of the non-conductive sleeves 10 which extend through the contact portions 7 and 8 respectively, and these dials are disposed adjacent the front base plate 1. Each of the dials is provided with suitable indicia such as is shown at 13, and the purpose of these dials will hereinafter be more fully described.

A flat arm 14 also of a non-conductive material is provided at its inner end with an eye which is fitted over the inner end of each of the insulated sleeves 11, and is secured thereon by means of the set screw 14'. Each arm extends radially from the insulated sleeve against the outer face of the contact plate 6, as is clearly illustrated in Figures 3 and 5 of the drawing. The outer end of each of the insulated arms 14 terminate flush with the peripheral edge of the respective circular end portions of the contact plate 6 as is also clearly illustrated in Figures 3 and 5.

Extending longitudinally through each of the insulated sleeves and adapted for rotation therein is the spindle 15. The spindle is adapted to fit sufficiently snug within each sleeve, as to prevent the accidental free rotation thereof. A knurled knob 16 is keyed or otherwise fixed on the outer or forward end of each spindle for facilitating the rotation thereof. A pointer 17 in the form of a rib is formed on the peripheral edge of each of the knurled knobs and is adapted for cooperation with the indicia on the respective dials 11 and 12 in the manner clearly illustrated in Figure 4.

A contact arm or finger 18, and formed of a strip of spring metal, is secured at its inner end on the inner end of each spindle 15 and as is more clearly illustrated in Figure 3, each of the contact arms or fingers is curved or bent angularly and the tapered outer end of these contact arms is rounded so as to be free to pass over the respective insulated pieces 14.

Each spindle is preferably in the form of a bolt, and the inner threaded end thereof provides a terminal or binding post. Suitable clamping nuts 19 are associated with the inner headed end of each bolt as is clearly shown in Figure 3.

One of the wires from the ignition circuit which extends or connects the spark plugs with the magneto is tapped as indicated by the wire shown at 20, and this wire 20 is secured to the terminal or inner end of the spindle which extends through the circular portion 8 of the contact plate 6. The spark plugs are illustrated at 21, and the wiring between the plugs and the magneto 22 is illustrated at 23.

The other terminals or inner end of the other spindle is connected to the audible signal 24 which is preferably a horn or siren by the wire 25 and the horn is also arranged in a suitable electric circuit, the source of energy therefor being shown at 26.

The portion of the switch which is arranged on the side of the dash board below the hood is enclosed within a suitable housing or casing shown at 27. The siren or horn 24 which forms the audible signal in the present invention is also arranged within this housing and furthermore the wires 23 which lead from the spark plugs of the internal combustion engine (not shown) to the magneto also extend through the housing to suitable openings provided therefor, such as is shown at 28. Access to the parts of the hinge enclosed within the housing is had through the medium of a hinged door 29, and normally the latter is held in a closed position by a suitable padlock or the like, shown at 30. Openings 31 are formed in the door 29 whereby the sound from the audible signal may be emitted so as to enable the signal to be easily heard.

When the insulated strips 14 are disposed in any predetermined position against the rear plate 2, and the spring contact fingers or arms 18 have their outer ends resting on the insulated members 14, in the manner shown in Figure 3, the circuit to the signal is broken, and the sounding of the alarm is prevented. Should any unauthorized person enter the car and attempt to steal the same, the attention of such person will be attracted by the dials and knobs which are clearly visible from the interior of the car, and as a result, such persons will attempt to actuate the dials or knobs thinking that the same have some connection with the ignition system in order to start the vehicle. As soon as the knobs are rotated so that the spring contact fingers are moved out of engagement with the insulated strips 14 and are brought into engagement with the circular portions 7 and 8 of the contact plate 6, the circuit to the audible signal will be closed and immediately the siren will be operated and will continue to operate, thereby operating a warning to indicate that the vehicle is being driven by an unauthorized person.

It is of course understood that the proper person knows the position at which the knobs should be set so as to position the spring contact fingers over the insulated strips 14 and the pointer 17 will cooperate with the indicia 13 on the respective dials to enable a person to readily ascertain the position of the spring contact fingers carried on the inner ends of the spindles. It is obvious that when the insulated arms 14 are moved, another combination must be used in order to prevent the spring contact fingers engaging the contact plate, and actuating the signal when it is not desired to do so.

A circular series of notches 32 are arranged in the outer face of each circular end portion 7 of the contact plate 6. Cooperating with these depressions is the projections 33 provided on the bottom of each nonconductive arm 14. This ratchet device will hold the arms 14 in any adjusted position against accidental movement. By rounding the outer end of each of the spring contact fingers, the latter will be permitted to freely move over the respective insulated strips.

An electric burglar alarm of the above mentioned character may be readily and easily attached on a motor vehicle instrument or dash board without necessitating any material alterations, and furthermore the alarm may be easily connected with the ignition system. The simplicity in which my improved switch is constructed renders the same positive and efficient in its operation at all times, and by enclosing the parts in a suitable casing or housing which is concealed beneath the hood, there will be no possibility of the burglar tampering with the parts of the switch which affect the actuation of the audible signal.

In the event that the authorized person should forget to turn the switch on when he leaves the vehicle, and should any unauthorized person enter the vehicle and attempt to steal the same, the attention of such person will be attracted by the alarm device and as a result will attempt to actuate the dials and knobs thinking that the same has some connection with the ignition system and effects the starting of the vehicle. Such operation of the device on the part of an unauthorized person will set the alarm.

While I have shown the preferred embodiment of my invention it is to be understood that minor changes in the size, shape and arrangement of parts may be resorted to without departing from the spirit of the invention and the scope of the appended claim.

Having thus described the invention, what I claim as new is:—

A switch comprising a pair of plates adapted to be secured on opposite sides of an automobile dashboard, a contact plate supported on one of the aforementioned plates, a sleeve of non-conductive material extending through the dashboard and through the first mentioned pair of plates, and also through the contact plate, a strip of non-conductive material secured on the inner end of the sleeve and adapted to cover a portion of the contact plate, said contact plate being provided with a series of spaced annular depressions in the outer face thereof, a projection formed on the bottom face of the insulated strip adapted for cooperation with said depression for holding the strip in any adjusted position, a dial member secured on the outer end of the sleeve and adapted for rotation therewith, a rotatable spindle extending longitudinally through the sleeve, a spring contact finger carried by the inner end of the spindle and normally adapted to rest on the insulated strip, and a knob on the outer end of the spindle for actuating the same whereby the spring contact finger may be moved out of engagement with the insulated strip and into engagement with the contact plate, and a pointer element carried by the knob and cooperating with the dial for indicating the positions of the spindle and the spring contact finger carried thereby.

In testimony whereof I affix my signature.

LAURENCE HADDOW.